United States Patent
Zhou et al.

(10) Patent No.: US 10,607,076 B2
(45) Date of Patent: Mar. 31, 2020

(54) METHOD FOR IRIS RECOGNITION AND RELATED PRODUCTS

(71) Applicant: Guangdong Oppo Mobile Telecommunications Corp., Ltd., Dongguan, Guangdong (CN)

(72) Inventors: Yibao Zhou, Guangdong (CN); Xueyong Zhang, Guangdong (CN); Cheng Tang, Guangdong (CN); Haitao Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 106 days.

(21) Appl. No.: 16/025,549

(22) Filed: Jul. 2, 2018

(65) Prior Publication Data
US 2019/0019007 A1 Jan. 17, 2019

(30) Foreign Application Priority Data
Jul. 14, 2017 (CN) .......................... 2017 1 0580125

(51) Int. Cl.
G06K 9/00 (2006.01)
G06K 9/40 (2006.01)

(52) U.S. Cl.
CPC ....... G06K 9/0061 (2013.01); G06K 9/00604 (2013.01); G06K 9/00617 (2013.01); G06K 9/40 (2013.01)

(58) Field of Classification Search
CPC ........... G06K 9/00617; G06K 9/00604; G06K 9/0061; G06K 9/40
See application file for complete search history.

(56) References Cited

U.S. PATENT DOCUMENTS

| | | | |
|---|---|---|---|
| 2009/0097715 A1* | 4/2009 | Cottard | G06K 9/00597 382/117 |
| 2010/0166265 A1 | 7/2010 | Martin | |
| 2015/0261998 A1* | 9/2015 | Yamanashi | G06T 5/003 382/103 |
| 2016/0117544 A1 | 4/2016 | Hoyos et al. | |

(Continued)

FOREIGN PATENT DOCUMENTS

| | | |
|---|---|---|
| CN | 101122949 A | 2/2008 |
| CN | 101539991 A | 9/2009 |
| CN | 101542503 A | 9/2009 |

(Continued)

OTHER PUBLICATIONS

International search report issued in corresponding international application No. PCT/CN2018/094965 dated Sep. 25, 2018.

(Continued)

*Primary Examiner* — Ruiping Li
(74) *Attorney, Agent, or Firm* — Young Basile Hanlon & MacFarlane, P.C.

(57) ABSTRACT

A method for iris recognition performed by related products includes the following. An iris recognition assembly of the terminal device acquires a first iris image. Thereafter, a processor removes a target eyelash image from the first iris image according to an eyelash image template stored in a memory to obtain a second iris image, and utilizes the second iris image to carry out iris recognition.

14 Claims, 7 Drawing Sheets

(56) References Cited

U.S. PATENT DOCUMENTS

2016/0232408 A1  8/2016  Lee et al.

FOREIGN PATENT DOCUMENTS

| CN | 102360418 A | 2/2012 |
| CN | 103488990 A | 1/2014 |
| CN | 105279492 A | 1/2016 |
| CN | 105389574 A | 3/2016 |
| CN | 105404851 A | 3/2016 |
| CN | 105631816 A | 6/2016 |
| EP | 3009960 A1 | 4/2016 |

OTHER PUBLICATIONS

Extended European search report issued in corresponding European application No. 18182261.0 dated Dec. 7, 2018.
Guangzhu Xu et al, Improving the Performance of Iris Recognition System Using Eyelids and Eyelashes Detection and Iris Image Enhancement, Jul. 1, 2006, pp. 871-876.
Weiqi Yuan et al, A novel eyelash detection method for iris recognition, Sep. 1, 2005, pp. 6536-6539.
Zhaofeng He et al, Toward Accurate and Fast Iris Segmentation for Iris Biometrics, Sep. 1, 2009, pp. 1670-1684.
Qichuan Tian, "Iris Recognition Principle and Algorithm", National Defense Industry Press, Jun. 30, 2010, Section 4.4.2 Image Size Determined by Pupil Position, pp. 48-52.

* cited by examiner

EYE AREA A

IMAGE B

FIRST IRIS IMAGE

TARGET EYELASH IMAGE

SECOND IRIS IMAGE

METHOD FOR IRIS RECOGNITION AND RELATED PRODUCTS

CROSS-REFERENCE TO RELATED APPLICATION(S)

This application claims priority to Chinese Patent Application No. 201710580125.X, filed on Jul. 14, 2017, the content of which is hereby incorporated by reference in its entirety.

TECHNICAL FIELD

This disclosure relates to the field of mobile terminals, and particularly to a method for iris recognition and related products.

BACKGROUND

With the development of mobile terminal technology, mobile terminals have played an increasingly important role in people's lives. In daily life, it has become more and more convenient to use the mobile terminal for payments, office work, and other activities.

However, while the mobile terminal brings convenience to people's lives, it also brings threats to information security and property security. To improve the security of the mobile terminal, fingerprint recognition technology has been applied to the mobile terminal. A user can only perform operations such as payment and information query after the fingerprint recognition is successful, which improves the security of the mobile terminal to some extent.

With the wide application of the fingerprint recognition technology, there are also vulnerabilities for fingerprint recognition, such as fake fingers, fingerprint films, etc., which means that the fingerprint recognition is no longer sufficient to ensure the security of the mobile terminal of a user.

SUMMARY

A method for iris recognition and related products are provided, which can reduce interference noise caused by eyelashes and improve the accuracy and success rate of iris recognition.

According to a first aspect of the disclosure, a terminal device is provided. The terminal device includes a processor, a memory, and an iris recognition assembly. The iris recognition assembly is coupled with the processor and configured to acquire a first iris image, where the first iris image includes a target eyelash image. The memory is coupled with the processor and configured to store an eyelash image template. The processor is configured to remove the target eyelash image from the first iris image according to the eyelash image template to obtain a second iris image, and carry out iris recognition according to the second iris image.

According to a second aspect of the disclosure, a method for iris recognition is provided. The method includes the following. A first iris image is acquired, where the first iris image includes a target eyelash image. The target eyelash image is removed from the first iris image according to a preset eyelash image template to obtain a second iris image. Iris recognition is performed according to the second iris image.

According to a third aspect of the disclosure, a non-transitory computer-readable storage medium is provided. The non-transitory computer-readable storage medium stor-ing a computer program which, when executed by a processor, causes the processor to carry out actions of: acquiring a first iris image; determining a first eyelash image of the first iris image; removing the first eyelash image from the first iris image to obtain a second iris image, in response to the first eyelash image being matched with an eyelash image template; performing iris recognition according to the second iris image.

BRIEF DESCRIPTION OF THE DRAWINGS

To illustrate the technical solutions embodied by the implementations of the present disclosure more clearly, the following briefly introduces the accompanying drawings required for describing the implementations. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Objects, technical solutions, and advantages of the implementations of the present disclosure will be described clearly hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first" and "second" used in the specification, the claims, and the accompanying drawings of the present disclosure are used to distinguish different objects rather than describe a particular order. The terms "include", "comprise", and "have" as well as variations thereof are intended to cover a non-exclusive inclusion. For example, a process, method, system, product, or apparatus including a series of steps or units is not limited to the listed steps or units, on the contrary, it can optionally further include other steps or units that are not listed; alternatively, other steps or units inherent to the process, method, product, or device can be included either. The term "A and/or B" refers to "A" alone, "B" alone, or a combination of "A" and "B".

The terminal device involved in the implementations of the present disclosure may include various handheld devices, on-board devices, wearable devices, computing devices that have wireless communication functions, or other processing devices connected to the wireless modem, as well as various forms of user equipment (UE), mobile stations (MSs), terminal devices, and the like. For the convenience of description, the above-mentioned devices are collectively referred to as a terminal device. The implementations of the disclosure can be detailed with reference to the accompanying drawings.

According to implementations of the disclosure, a method for iris recognition and related products are provided. Iris recognition uses video camera technology with subtle near infrared illumination to acquire images of the detail-rich, intricate structures of the iris which are visible externally. A key advantage of iris recognition, besides its speed of matching and its extreme resistance to false match, is the stability of the iris as an internal and protected, yet externally visible organ of the eye. With aid of the technical solutions provided herein, during iris recognition, the interference noise caused by eyelashes can be reduced, and the accuracy and success rate of iris recognition can be improved. The following are described in detail.

Figure 1:
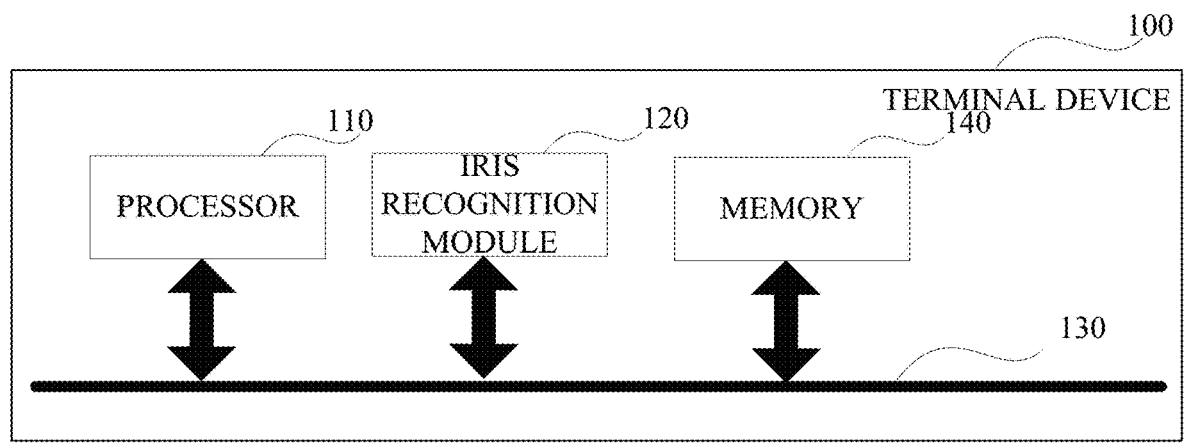
FIG. 1 is a schematic structural diagram illustrating a terminal device according to an implementation of the disclosure.

Referring to FIG. 1, FIG. 1 is a schematic structural diagram illustrating a terminal device 100 according to an implementation of the disclosure. The terminal device 100 includes a processor 110, an iris recognition assembly 120, and a memory 140. The processor 110 is coupled with the iris recognition assembly 120 and the memory 140 via a bus 130, such that the processor 110, the iris recognition assembly 120, and the memory 140 can communicate with each other. The iris recognition assembly 120 may include an iris recognition sensor and related components or circuits.

In one implementation, the processor may be a central processing unit (CPU). In some other implementations, the processor can also be referred to as an application processor (AP) to distinguish from a baseband processor.

Figure 2:
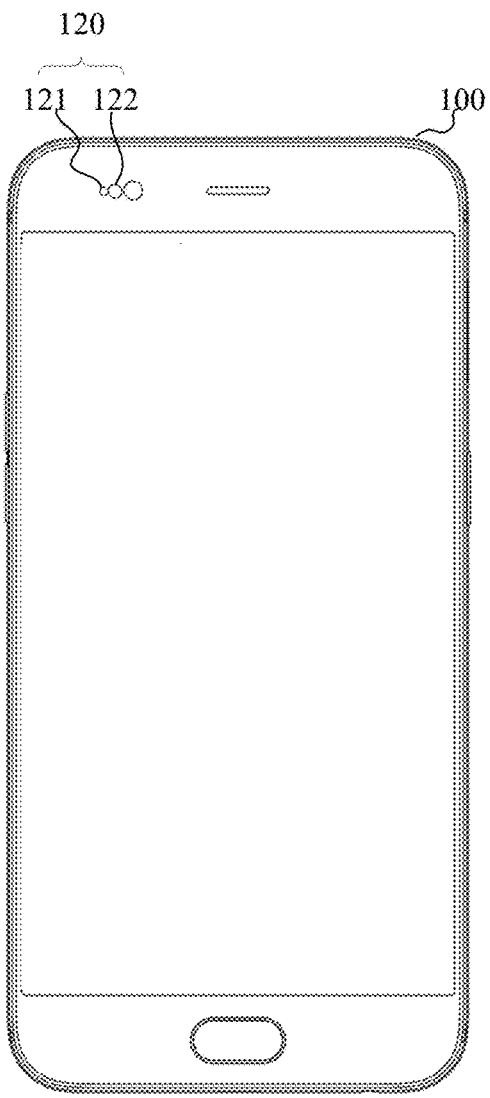
FIG. 2 is a schematic diagram illustrating another terminal device according to an implementation of the disclosure.

Referring to FIG. 2, FIG. 2 is a schematic diagram illustrating another terminal device 100 according to an implementation of the disclosure. As illustrated in FIG. 2, the iris recognition assembly 120 includes an infrared fill light 121 and an infrared camera 122. When performing iris recognition, infrared emitted by the infrared fill light 121 is irradiated on an iris and then reflected back to the infrared camera 122 from the iris, such that the infrared camera 122 can collect iris images. According to the principle that the iris recognition assembly 120 is configured to perform recognition through infrared rays, iris recognition can be achieved successfully even in environments with weak ambient light intensity or even in a dark environment.

In one implementation, the iris recognition assembly 120 is configured to acquire a first iris image of a user and transmit the first iris image to the processor 110. The memory 140 is configured to store an eyelash image template and an iris image template. The processor 110 is configured to remove the target eyelash image from the first iris image according to the eyelash image template to obtain a second iris image, and to carry out iris recognition according to the second iris image. For example, the target eyelash image can be removed from the first iris image (for example, cutting out, cropping), or the target eyelash image can be eliminated or excluded from the first iris image in any other suitable manners.

As one implementation, in terms of obtaining the second iris image, the processor 110 is configured to determine whether the target eyelash image in the first iris image is matched with the preset eyelash image template; remove (for example, cut out) the target eyelash image from the first iris image to obtain the second iris image, when the target eyelash image is matched with the eyelash image template. A threshold matching value can be used to determine whether the target eyelash image is matched with the eyelash image template. For example, if the ratio of feature points matching successfully can reach 90% or even higher, it can be considered that the target eyelash image is matched with the eyelash image template. On the other hand, if the target eyelash image is not matched with the eyelash image template, one possible way to deal with it is discard the iris image and recapture another iris image and then, repeat the foregoing operations. Continuing, if a threshold number of times have been tried and still no matched target eyelash image can be extracted from the iris image captured, it can be considered that the iris recognition is failed.

As one implementation, in terms of iris recognition, the processor 110 is configured to cut out from the iris image template an image in an area corresponding to the target eyelash image to obtain an iris image sub-template, and determine whether the second iris image is matched with the iris image sub-template.

In one implementation, for the security of privacy information and property information of the user in the terminal device 100, in scenes such as waking up the terminal device, starting a payment application, and making a payment, a request to invoke an iris recognition function may be initiated through an operating system or an application of the terminal device. Upon receiving the request to invoke the iris recognition function, the processor 110 is configured to determine that an operation instruction for starting iris recognition has been received.

In one implementation, the iris recognition assembly 120 is configured to acquire a face image of the user through the infrared camera 122 and extract the first iris image from the face image of the user. In addition, the iris recognition assembly 120 can be configured to extract an eye image of the user from the face image, determine a pupil center and an iris radius of the user according to the eye image, and determine a circular area in the eye image according to the pupil center and the iris radius. An image within the circular area is the first iris image. Alternatively, the iris recognition assembly 120 is configured to acquire or capture an eye image or the user through the infrared camera 122 and extract the first iris image from the eye image of the user. In this case, there's no need to extract the eye image from the face image.

Figure 3:
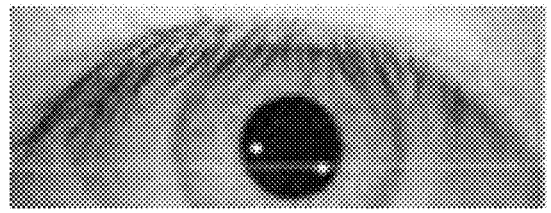
FIG. 3 is a schematic diagram illustrating a process of determining a pupil center according to an implementation of the present disclosure.
Figure 3:
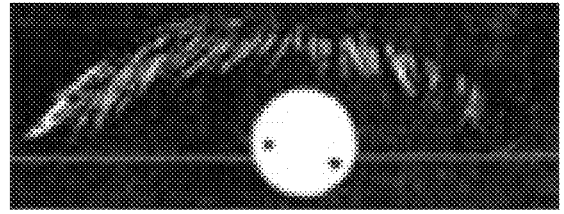

In short, to obtain the iris image, the terminal has to localize the inner and outer boundaries of the iris (pupil and limbus) in an image of an eye. As one implementation, a pupil area can be determined through binarization processing. The pupil center can be determined by obtaining a center of the pupil area. Referring to FIG. 3, FIG. 3 is a schematic diagram illustrating the process of determining a pupil center according to an implementation of the present disclosure. The pupil center can be determined as follows.

a) an eye area A is acquired by positioning an inner boundary; b) the eye area A is binarized with a preset threshold T0, and the result of the binarization processing is reverted to obtain an image B; c) the pupil area is extracted from the image B by selecting the maximum connected area (in other words, maximum connected component); d) the center of the pupil area is determined as the pupil center.

After the pupil center is acquired, visible boundaries of the iris can be obtained through a boundary extraction process. Boundaries of the iris mainly refer to iris boundaries on the left and right sides, which are not occluded by eyelashes and the lower eyelid. Thereafter, the iris radius can be determined by analyzing a distance from the visible boundaries of the iris to the pupil center. After this, the first iris image can be determined according to the pupil center and the iris radius.

Since the eyelash distribution of human eyes generally has a certain regularity, the target eyelash image can be extracted from the first iris image and then compared with the eyelash image template. When the target eyelash image is matched with the eyelash image template, it can provide some reference for iris recognition.

Since the location of each individual eyelash may vary, when determining whether the target eyelash image is matched with the eyelash image template, rough features can be extracted to carry out a fuzzy comparison (in other words, fuzzy matching), so as to improve the success rate of the comparison between the target eyelash image and the eyelash image template. Rough features refer to the features which are obtained while taking the eyelashes as a whole rather than obtained by carrying out feature extraction on each eyelash separately. Examples of the rough features include but not limited to the overall distribution and texture of the eyelashes.

After knowing the target eyelash image is matched, the terminal device 100 can be configured to perform iris feature comparison on the second iris image, which is an iris image obtained by removing (such as cutting out) the target eyelash image from the first iris image. When the second iris image is matched successfully, it indicates that the user passes the iris recognition.

Figure 4:
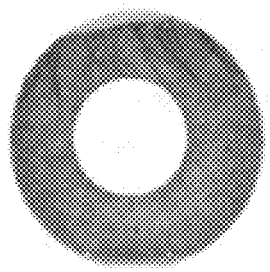
FIG. 4 is a schematic diagram illustrating a first iris image, a target eyelash image, and a second iris image according to an implementation of the disclosure.
Figure 4:
Figure 4:
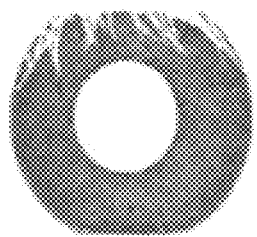

FIG. 4 is a schematic diagram illustrating the first iris image, the target eyelash image, and the second iris image obtained through the foregoing method according to an implementation of the disclosure. As can be seen from FIG. 4, compared with the first iris image, in the second iris image, the target eyelash image has been removed.

In one implementation, when the second iris image is compared with the preset iris image template, since the second iris image is an iris image obtained by cropping the first iris image, the second iris image does not have iris information about the parts occluded by eyelashes. Therefore, an iris image corresponding to an area of the target eyelash image can be cut out from the iris image template to obtain an iris image sub-template. The second iris image can be compared with the iris image sub-template so as to improve the success rate of iris recognition.

In addition, in one implementation, when a user uses the terminal device 100, the terminal device 100 may be configured to acquire a plurality of iris images containing eyelash information of the user, and then extract and synthesize a plurality of eyelash images to obtain the above-mentioned eyelash image template. In this way, image superimposition of the plurality of images allows reducing the influence of noise such as Gaussian noise, light spots, and insufficient light, so as to obtain a more accurate eyelash image template.

As one implementation, the terminal device 100 can be configured to obtain the eyelash image template as follows.

The iris recognition assembly 120 is further configured to acquire N iris images of the user when the terminal device 100 is in an awake state, and transmit the N iris images to the processor 110, where N is a positive integer greater than 1. The processor 110 is further configured to extract M eyelash images from the N iris images and obtain the eyelash image template according to the M eyelash images and a plurality of weight values, where M is a positive integer smaller than or equal to N. For example, a weighted-average process can be performed on the M eyelash images to obtain the eyelash image template. As can be seen, sometimes, M may be smaller than N, this is because, in some of the iris images, the iris is not occluded by the eyelash at all and therefore, no eyelash image will be extracted.

The weight values can be determined according to at least one of the image quality and the proportion of an eyelash image in the whole iris image. For example, for a fuzzy image, a lower weight value can be set. Still another example, for an eyelash image which accounts for 5% of the whole iris image, a lower weight will be set correspondingly.

Thus, with aid of the terminal device illustrated in FIG. 1, after the target eyelash image is matched with the eyelash image template, a portion of an eyelash image can be removed from the iris image of the user, and iris recognition can be performed with remaining iris information. As such, interference noise caused by eyelashes can be reduced and the accuracy and success rate of iris recognition can be improved.

Figure 5:
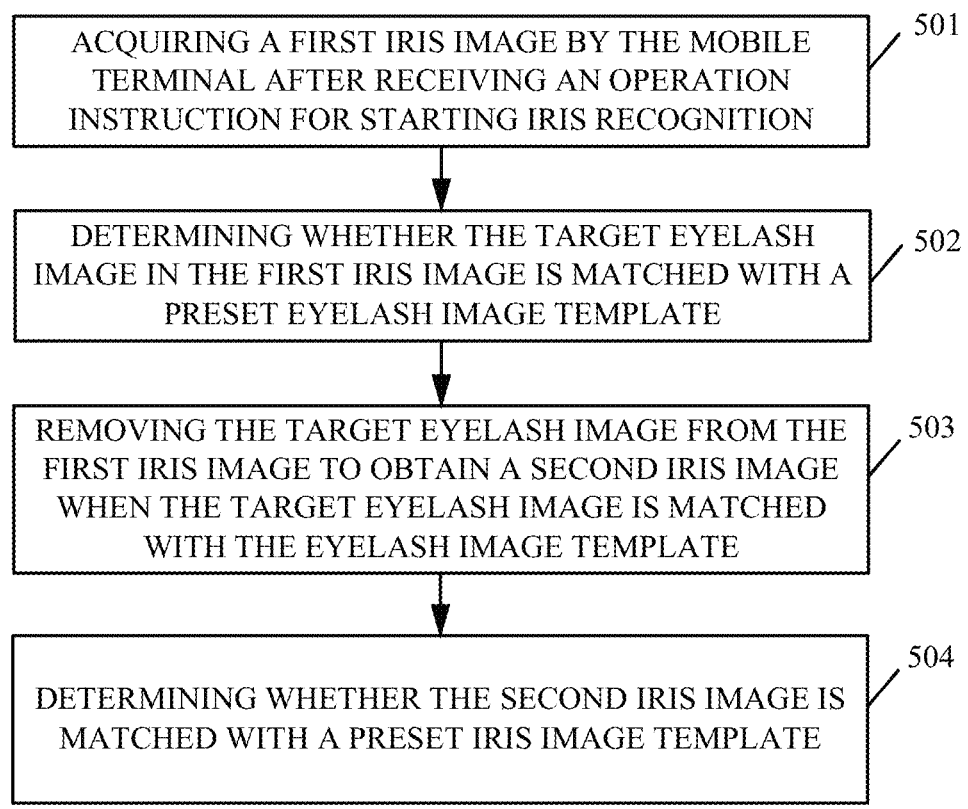
FIG. 5 is a schematic flow chart illustrating a method for iris recognition according to an implementation of the disclosure.

Referring to FIG. 5, FIG. 5 is a schematic flow diagram illustrating a method for iris recognition according to an implementation of the disclosure. The method for iris recognition can be performed at a terminal device. As illustrated in FIG. 5, the method begins at block 501.

At block 501, after receiving an operation instruction for starting iris recognition, a first iris image is acquired by the terminal device.

In one implementation, the terminal device can acquire a face image of a user through an iris recognition assembly, crop the face image to obtain an eye image, and acquire the first iris image according to the eye image. As mentioned before, the eye image can be captured through the iris recognition assembly directly.

As one implementation, the terminal device can determine a pupil center and an iris radius of the user according to the eye image, and determine a circular area of the eye image according to the pupil center and the iris radius. An image within the circular area will be treated as the first iris image.

At block 502, determine whether the target eyelash image in the first iris image is matched with a preset eyelash image template.

In one implementation, the terminal device can perform boundary detection on the first iris image to acquire boundaries of an eyelash image in the first iris image. Further, the terminal device can crop the first iris image according to the boundaries of the eyelash image to extract the target eyelash image from the first iris image.

Since the eyelash distribution of human eyes generally has a certain regularity, the target eyelash image can be extracted from the first iris image and then compared with the eyelash image template to see whether the target eyelash image is matched with the eyelash image template. When the target eyelash image is matched with the eyelash image template, it can provide some reference for iris recognition.

Since the location of each individual eyelash may vary, when determining whether the target eyelash image is matched with the eyelash image template, rough features can be extracted to carry out a fuzzy comparison (in other words, fuzzy matching), so as to improve the success rate of the comparison between the target eyelash image and the eyelash image template.

At block 503, when the target eyelash image is matched with the eyelash image template, the target eyelash image is cut out from the first iris image to obtain a second iris image.

At block 504, determine whether the second iris image is matched with a preset iris image template; when the second iris image is matched with the iris image template, it indicates that the iris recognition for the user is successful. The preset iris image template can be obtained by performing a weighted-average process on a plurality of iris images for example.

After knowing that the target eyelash image is matched with the eyelash image template, the terminal device can perform iris feature comparison on the second iris image, which is an iris image obtained by cutting out the target eyelash image from the first iris image as mentioned above. When iris features of the second iris image are matched with that of the iris image template, it indicates that the user passes the iris recognition.

In one implementation, when the second iris image is compared with the preset iris image template, since the second iris image is an iris image obtained by cropping the first iris image, the second iris image does not have iris information about the parts occluded by eyelashes. An iris image corresponding to an area of the target eyelash image can be cut out from the iris image template to obtain an iris image sub-template. The second iris image can be compared with the iris image sub-template to improve the success rate of iris recognition. From some point of view, the iris image template can be regarded as including two parts, that is, the iris image sub-template and the eyelash image template.

As can be seen, with aid of the method illustrated in FIG. 5, a portion of an eyelash image can be removed from the iris image of the user after the target eyelash image is matched with the eyelash image template, and iris recognition may be carried out using remaining iris information. As such, interference noise caused by eyelashes can be reduced and the accuracy and success rate of iris recognition can be improved.

Figure 6:
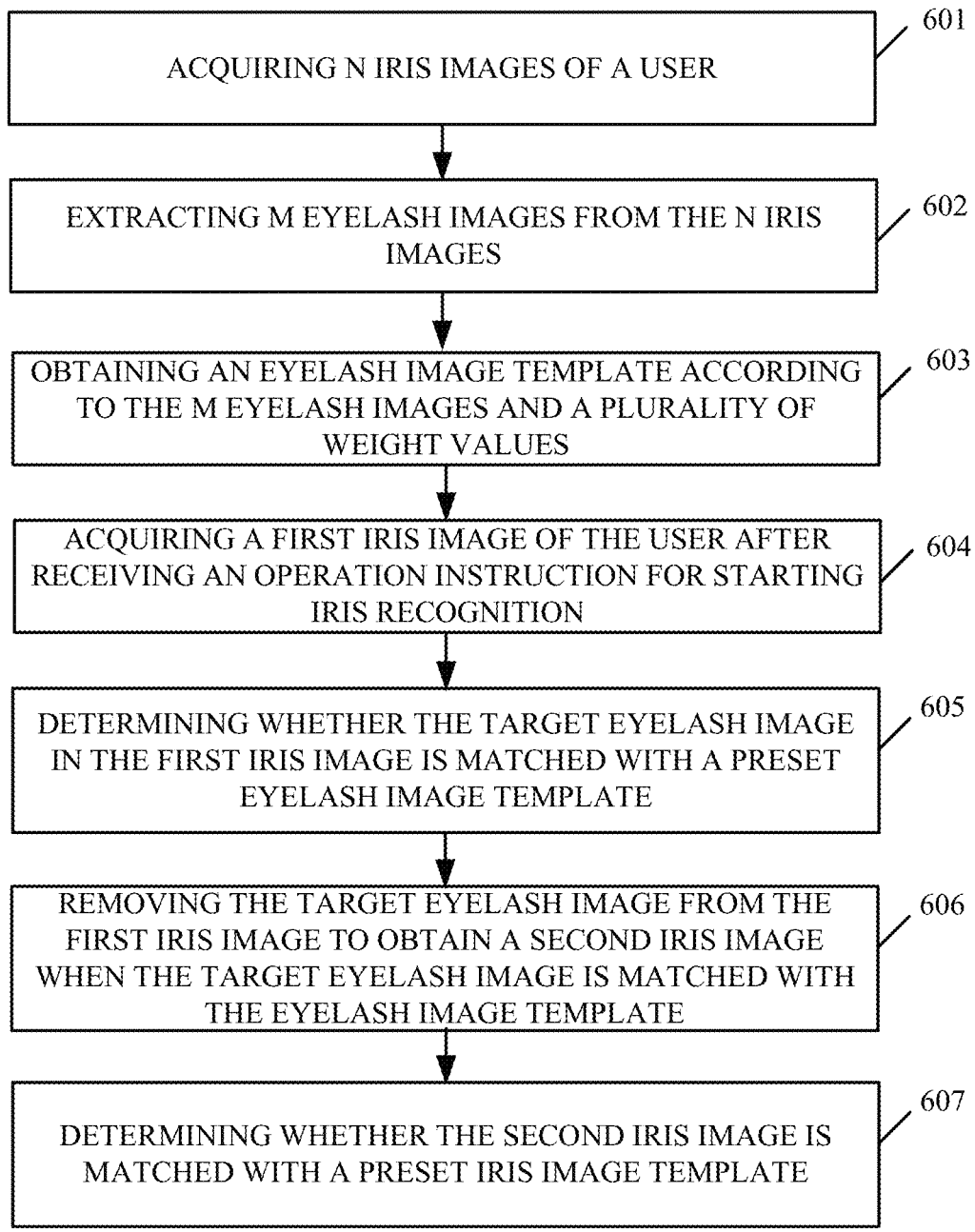
FIG. 6 is a schematic flow chart illustrating another method for iris recognition according to an implementation of the disclosure.

Referring to FIG. 6, FIG. 6 is a schematic flow diagram illustrating another method for iris recognition according to an implementation of the disclosure. The method for iris recognition can be performed at a terminal device. Compared with the method illustrated in FIG. 5, operations for setting an eyelash image template are illustrated in FIG. 6. As illustrated in FIG. 6, the method for iris recognition begins at block 601.

At block 601, when the terminal device is in an awake state, N iris images of a user are acquired.

In one implementation, N is a positive integer greater than 1. After acquiring more than one iris image, the terminal device can extract eyelash images from the more than one iris image and synthesize to obtain an eyelash image template. In this way, image superimposition of the plurality of images allows reducing the influence of noise such as Gaussian noise, light spots, and insufficient light. Therefore, a more accurate eyelash image template can be obtained.

At block 602, M eyelash images are extracted from the N iris images.

In one implementation, the terminal device can extract more than one eyelash image for superposition and synthesis from a plurality of iris images to obtain an eyelash image template. That is, the eyelash image template can be obtained through superposition and synthesis of eyelash images.

At block 603, obtain the eyelash image template according to the M eyelash images and a plurality of weight values.

In one implementation, the M eyelash images are subjected to a weighted-average process. The weight values can be determined according to the image quality and/or the proportion of an eyelash image in the whole iris image. For example, for a fuzzy image, a lower weight value can be set. Still another example, for an eyelash image which accounts for 5% of the whole iris image, a lower weight will be set correspondingly.

At block 604, after receiving an operation instruction for starting iris recognition, a first iris image of the user is acquired.

In one implementation, the terminal device can acquire a face image of the user through an iris recognition assembly, crop the face image to obtain an eye image, and acquire the first iris image according to the eye image.

At block 605, determine whether the target eyelash image in the first iris image is matched with a preset eyelash image template.

In one implementation, the terminal device can perform boundary detection on the first iris image to acquire boundaries of an eyelash image in the first iris image. Further, the terminal device can crop the first iris image according to the boundaries of the eyelash image to extract the target eyelash image from the first iris image.

Since the eyelash distribution of human eyes generally has a certain regularity, the target eyelash image can be extracted from the first iris image and then compared with the eyelash image template. When the target eyelash image is matched with the eyelash image template, it can provide some reference for iris recognition.

Since the location of each individual eyelash may vary, when the target eyelash image is compared with the eyelash image template, rough features can be extracted to carry out a fuzzy comparison (in other words, fuzzy matching), so as to improve the success rate of the comparison between the target eyelash image and the eyelash image template.

At block 606, when the target eyelash image is matched with the eyelash image template, the target eyelash image is cut out from the first iris image to obtain a second iris image.

At block 607, determine whether the second iris image is matched with a preset iris image template; when the second iris image is matched with the iris image template, it indicates that the iris recognition for the user is successful.

In one implementation, when the second iris image is compared with the preset iris image template, because the second iris image is an iris image obtained by cropping the first iris image, the second iris image does not have iris information about the parts occluded by eyelashes. An iris image corresponding to an area of the target eyelash image can be cut out from the iris image template to obtain an iris image sub-template. The second iris image can be compared with the iris image sub-template to improve the success rate of iris recognition.

As can be seen, with aid of the method illustrated in FIG. 6, a portion of an eyelash image can be removed from the iris image of the user after the target eyelash image is matched with the eyelash image template, and iris recognition may be carried out using remaining iris information. As such, interference noise caused by the eyelashes can be reduced and the accuracy and success rate of iris recognition can be improved.

Figure 7:
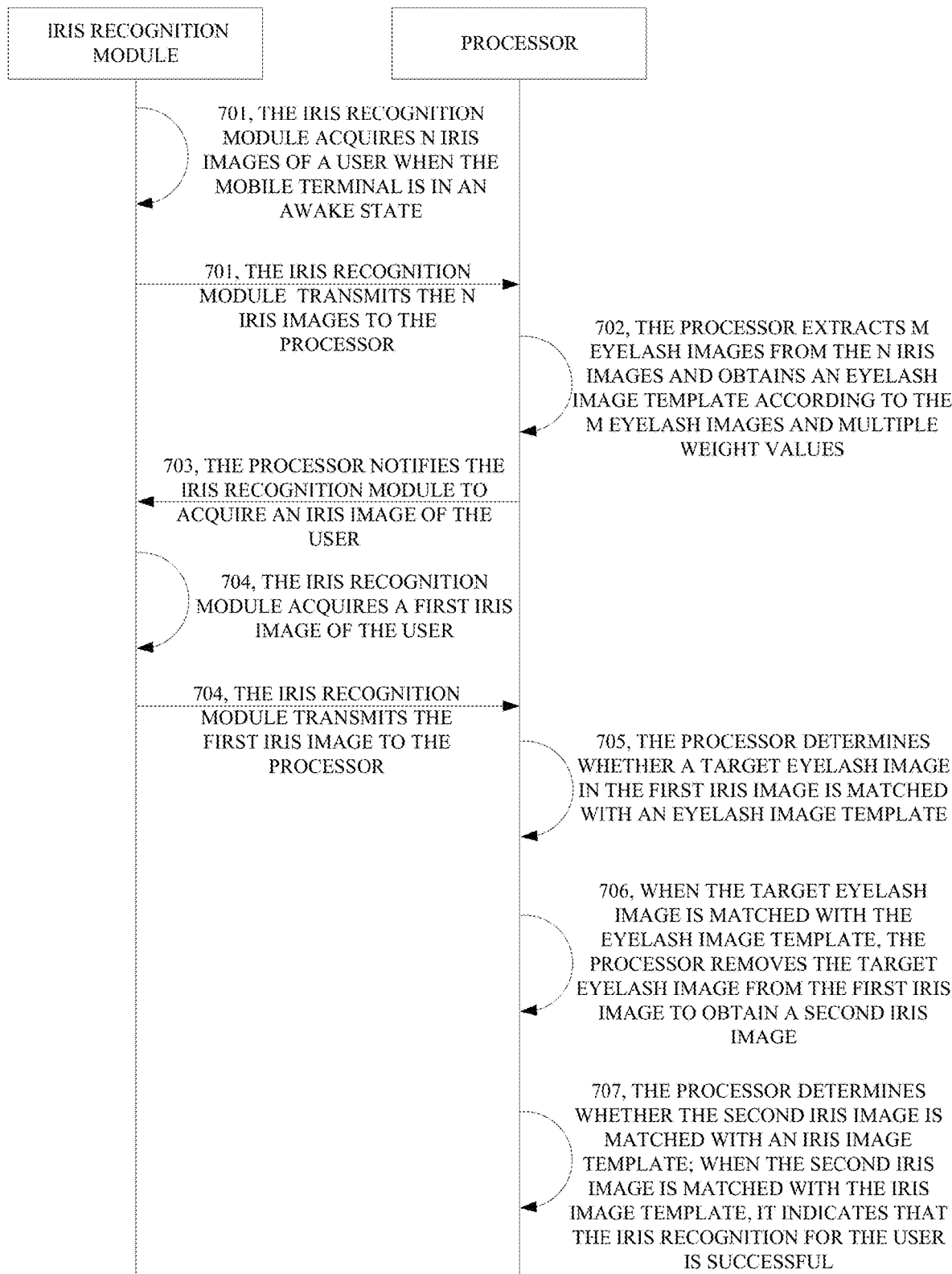
FIG. 7 is a schematic flow chart illustrating still another method for iris recognition according to an implementation of the disclosure.

Referring to FIG. 7, FIG. 7 is a schematic flow diagram illustrating still another method for iris recognition according to an implementation of the disclosure. The method for iris recognition can be applied to a terminal device including a processor and an iris recognition assembly. As illustrated in FIG. 7, the method for iris recognition begins at block 701.

At block 701, the iris recognition assembly acquires N iris images of a user when the terminal device is in an awake state, and transmits the N iris images to the processor.

In one implementation, N is a positive integer greater than 1. After acquiring more than one iris image, the terminal device can extract eyelash images from the more than one iris image and synthesize to obtain an eyelash image template. In this way, image superimposition of the plurality of images allows reducing the influence of noise such as Gaussian noise, light spots, and insufficient light. Therefore, a more accurate eyelash image template can be obtained.

At block 702, the processor extracts M eyelash images from the N iris images and obtains an eyelash image template according to the M eyelash images and multiple weight values.

In one implementation, the terminal device can extract more than one eyelash image for superposition and synthesis from a plurality of iris images to obtain an eyelash image template.

In one implementation, the M eyelash images are subjected to a weighted-average process. The weight values can be determined according to the image quality and/or the proportion of an eyelash image in the whole iris image. For example, for a fuzzy image, a lower weight value can be set. Still another example, for an eyelash image which accounts for 5% of the whole iris image, a lower weight will be set correspondingly.

At block 703, after receiving an operation instruction for starting iris recognition, the processor notifies the iris recognition assembly to acquire an iris image of the user.

At block 704, the iris recognition assembly acquires a first iris image of the user and transmits the first iris image to the processor.

In one implementation, the iris recognition assembly can extract an eye image of the user from a face image, determine a pupil center and an iris radius of the user according to the eye image, and determine a circular area in the eye image according to the pupil center and the iris radius. An image within the circular area will be treated as the first iris image.

At block 705, the processor determines whether a target eyelash image in the first iris image is matched with a preset eyelash image template.

In one implementation, the terminal device can perform boundary detection on the first iris image to acquire boundaries of an eyelash image in the first iris image. Further, the terminal device can crop the first iris image according to the boundaries of the eyelash image to extract the target eyelash image from the first iris image.

Since the eyelash distribution of human eyes generally has a certain regularity, the target eyelash image can be extracted from the first iris image and then compared with the eyelash image template to determine whether the target eyelash image is matched with the eyelash image template. When the target eyelash image is matched with the eyelash image template, it can provide some reference for iris recognition.

Since the location of each individual eyelash may vary, when the target eyelash image is compared with the eyelash image template, rough features can be extracted to carry out a fuzzy comparison (in other words, fuzzy matching), so as to improve the success rate of the comparison between the target eyelash image and the eyelash image template.

At block 706, when the target eyelash image is matched with the eyelash image template, the processor removes the target eyelash image from the first iris image to obtain a second iris image.

At block 707, the processor determines whether the second iris image is matched with a preset iris image template; when the second iris image is matched with the iris image template, it indicates that the iris recognition for the user is successful.

In one implementation, when the second iris image is compared with the preset iris image template, because the second iris image is an iris image obtained by cropping the first iris image, the second iris image does not have iris information about the parts occluded by eyelashes. An iris image corresponding to an area of the target eyelash image can be cut out from the iris image template to obtain an iris image sub-template. The second iris image can be compared with the iris image sub-template to improve the success rate of iris recognition.

As can be seen, according to the method illustrated in FIG. 7, a portion of an eyelash image can be removed from the iris image of the user may be removed after the target eyelash image is matched with the eyelash image template, and iris recognition may be carried out using remaining iris information. As such, interference noise caused by the eyelashes can be reduced and the accuracy and success rate of iris recognition can be improved.

Figure 8:
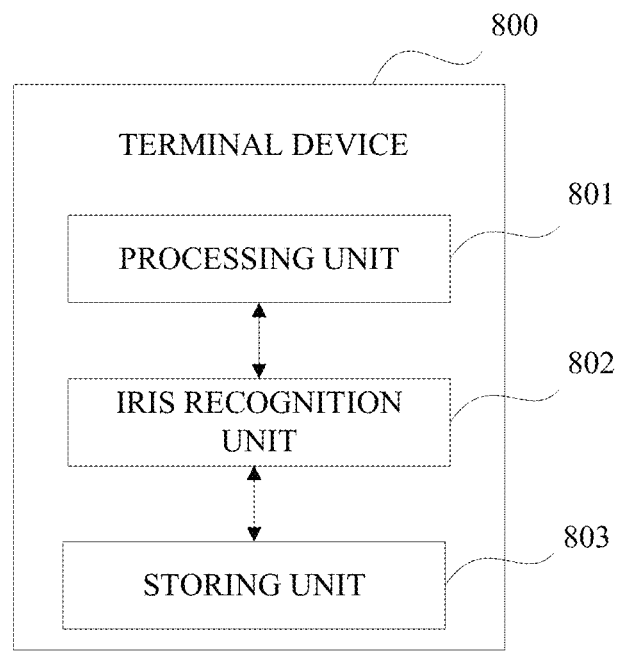
FIG. 8 is a schematic block diagram illustrating functional units of a terminal device according to an implementation of the disclosure.

Referring to FIG. 8, FIG. 8 is a block diagram illustrating functional units of a terminal device 800 according to an implementation of the disclosure. As illustrated in FIG. 8, the terminal device 800 can include a processing unit 801 (such as a processor), an iris recognition unit 802 (such as an iris recognition sensor or iris recognition module), and a storing unit 803 (such as a storage).

The iris recognition unit 802 is configured to acquire a first iris image, where the first iris image includes a target eyelash image. The storing unit 803 is configured to store an eyelash image template. The processing unit 801 is configured to remove the target eyelash image from the first iris image according to the eyelash image template to obtain a second iris image, and carry out iris recognition according to the second iris image.

It can be understood that, in order to implement the above functions, the terminal device includes hardware structures and/or software modules corresponding to the respective functions. Those skilled in the art should readily recognize that, in combination with the exemplary units and scheme steps or operations described in the implementations provided herein, the present disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the present disclosure.

According to the implementations of the present disclosure, functional units may be divided for the terminal device according to the foregoing method examples. For example, functional units may be divided according to corresponding functions and two or more functions may be integrated into one processing unit. The above-mentioned integrated unit can be implemented in the form of hardware or software functional units. It should be noted that the division of units in the implementations of the present disclosure is schematic and is merely a logical function division; there may be other division modes in actual implementations.

As one implementation, the processing unit 801 can be, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. The iris recognition unit 802 can be an iris recognition assembly including an infrared fill light and an infrared camera.

It can be seen that, with aid of the terminal device illustrated in FIG. 8, after the target eyelash image is matched with the eyelash image template, a portion of an eyelash image can be removed from the iris image of the user, and iris recognition can be performed with remaining iris information. The interference noise caused by eyelashes can be reduced and the accuracy and success rate of iris recognition can be improved.

Figure 9:
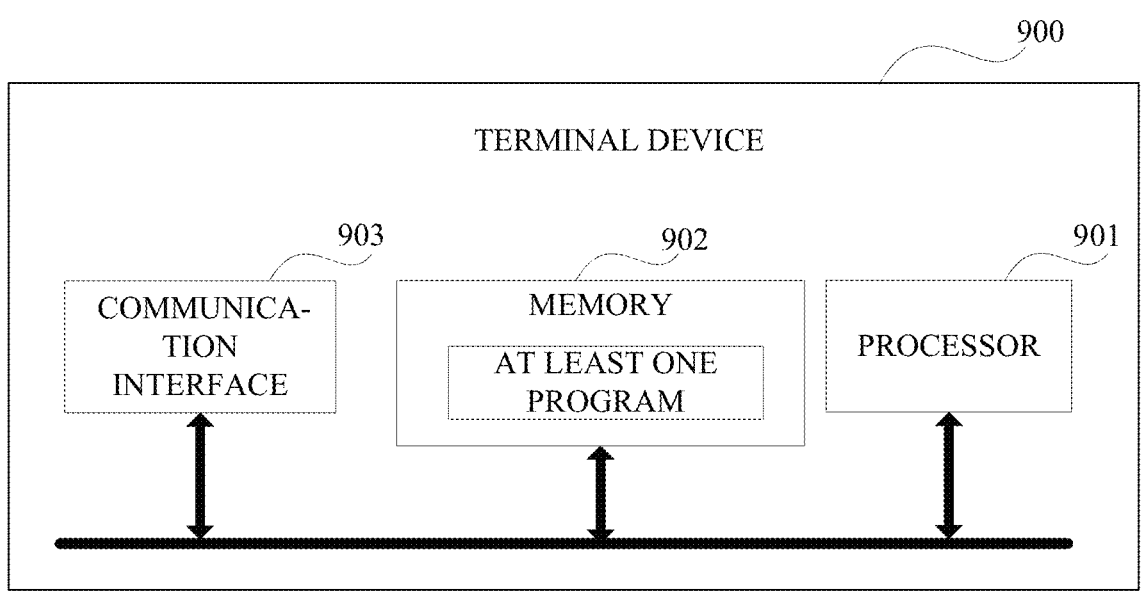
FIG. 9 is a schematic structural diagram illustrating another terminal device according to an implementation of the disclosure.

Referring to FIG. 9, FIG. 9 is a schematic structural diagram illustrating another terminal device 900 according to an implementation of the disclosure. As illustrated in FIG. 9, the terminal device 900 includes a processor 901, a memory 902, a communication interface 903, and at least one program. The at least one program is stored in the memory and configured to be performed by the processor. The at least one program includes instructions being operable to perform operations of the method implementations.

For example, the at least one program includes instructions for performing the following operations. After receiving an operation instruction for starting iris recognition, a first iris image of a user is acquired. Determine whether a target eyelash image in the first iris image is matched with a preset eyelash image template. When the target eyelash image is matched with the eyelash image template, the target eyelash image is cut out from the first iris image to obtain a second iris image. Determine whether the second iris image is matched with a preset iris image template; when the second iris image is matched with the preset iris image template, it indicates that the user passes the iris recognition.

As one implementation, the at least one program further includes instructions for performing the following operations. When the terminal device is in an awake state, N iris images of the user can be acquired, where N is a positive integer greater than 1. M eyelash images are extracted from the N iris images, where M is a positive integer smaller than or equal to N. The M eyelash images are subjected to a weighted-average process to obtain the eyelash image template.

As one implementation, in terms of acquiring the first iris image of the user, the instructions are configured to: determine a pupil center and an iris radius of the user according to an acquired eye image of the user; extract the first iris image from the eye image of the user according to the pupil center and the iris radius.

As one implementation, the at least one program further includes instructions configured to perform boundary detection on the first iris image to acquire boundaries of an eyelash image in the first iris image, and to crop the first iris image to extract the target eyelash image from the first iris image according to the boundaries of the eyelash image.

As one implementation, in terms of comparing the second iris image with the preset iris image template, the instructions are configured to: cut out an area corresponding to the target eyelash image from the iris image template to obtain an iris image sub-template; determine whether the second iris image is matched with the iris image sub-template.

It can be seen, with aid of the terminal device illustrated in FIG. 9, after the target eyelash image is matched with the eyelash image template, a portion of an eyelash image can be removed from the iris image of the user, and iris recognition can be performed with remaining iris information. The interference noise caused by eyelashes can be reduced and the accuracy and success rate of iris recognition can be improved.

Figure 10:
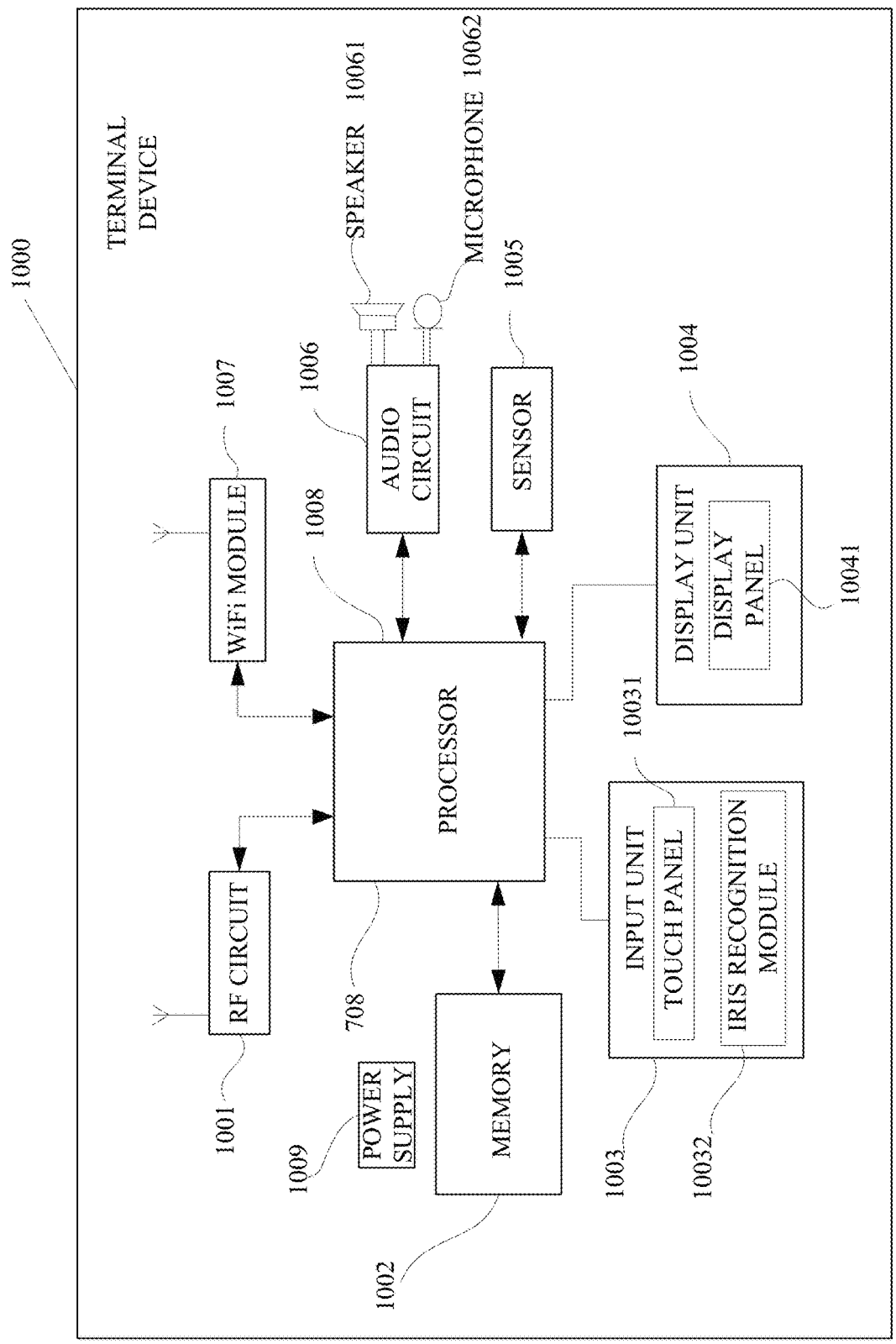
FIG. 10 is a schematic structural diagram illustrating still another terminal device according to an implementation of the disclosure.

FIG. 10 is a schematic structural diagram illustrating another terminal device 1000 according to an implementation of the present disclosure. As illustrated in FIG. 10, only parts related to the implementation of the disclosure are illustrated for the convenience of description. For technical details not described, reference may be made to the method implementations of the present disclosure. The terminal device may be any terminal device, such as a mobile phone, a tablet computer, a personal digital assistant (PDA), a point of sale terminal (POS), an on-board computer, and the like. The following describes a mobile phone as an example of the terminal device.

FIG. 10 is a block diagram of a partial structure of a mobile phone related to a terminal device according to an implementation of the disclosure. Referring to FIG. 10, the mobile phone includes an RF (radio frequency) circuit 1001, a memory 1002, an input unit 1003, a display unit 1004, a sensor 1005, an audio circuit 1006, a Wi-Fi (wireless fidelity) module 1007, a processor 1008, and a power supply 1009 and other components. Those skilled in the art can understand that the structure of the mobile phone illustrated in FIG. 10 does not constitute any limitation on a mobile phone. The mobile phone configured to implement technical solutions of the disclosure may include more or fewer components than illustrated, or may combine certain components or different components.

In the following, various components of the mobile phone will be described in detail with reference to FIG. 10.

The RF circuit 1001 is configured to receive or transmit information, or configured to receive or transmit signals during a call. Specifically, the RF circuit 1001 is configured to receive downlink information from a base station and transmit the downlink information received to the processor 1008 for processing. In addition, the RF circuit 1001 is configured to transmit uplink data to the base station. Generally, the RF circuit 1001 includes but is not limited to an antenna, at least one amplifier, a transceiver, a coupler, a low noise amplifier (LNA), a duplexer and the like. In addition, the RF circuit 1001 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 1002 is configured to store software programs and modules. The processor 1008 is configured to execute various function applications and data processing of the mobile phone by running the software programs and the modules stored in the memory 1002. The memory 1002 mainly includes a program storage area and a data storage area. The program storage area may store an operating system, applications required for at least one function (such as sound playback function, image playback function, etc.). The data storage area may store data (such as audio data, contacts information, etc.) created according to use of the mobile phone, and so on. In addition, the memory 1002 may include a high-speed RAM, and may further include a non-volatile memory such as at least one disk storage device, a flash device, or other non-volatile solid storage devices.

The input unit 1003 may be configured to receive input digital or character information and generate key signal input associated with user setting and function control of the mobile phone. As one implementation, the input unit 1003 may include a touch panel 10031, an iris recognition assembly 10032. The input unit may alternatively or additionally include a fingerprint recognition assembly and a face recognition assembly. The touch panel 10031, also known as a touch screen, is configured to collect touch operations of a user touching the touch panel 10031 or areas around the touch panel 10031 (such as operations of touching the touch panel 10031 or areas around the touch panel 10031 with any suitable object or accessory such as a finger or a stylus), and to drive a corresponding connection device according to a preset procedure. Optionally, the touch panel 10031 may include a touch detection device and a touch controller. The touch detection device is configured to detect the user's touch orientation and signals generated in response to the touch operation, and transmit the signals to the touch controller. The touch controller is configured to receive the touch information from the touch detection device, convert the touch information into contact coordinates, and then transmit the contact coordinates to the processor 1008. The touch controller can also be configured to receive and execute commands from the processor 1008. In addition, the touch panel 10031 may be implemented in various manners such as resistive, capacitive, infrared, and surface acoustic waves. The iris recognition assembly 10032, which is configured to receive iris information input by a user to recognize the user's identity.

The display unit 1004 is configured to display information input by the user or information provided for the user or various menus of the mobile phone. The display unit 1004 may include a display panel 10041. Alternatively, the display panel 10041 may be in the form of a liquid crystal display (LCD), an organic light-emitting diode (OLED) and so on. The touch panel 10031 may cover the display panel 10041. After detecting a touch operation on or around the touch panel 10031, the touch panel 10031 is configured to transmit the touch operation to the processor 1008 to determine a type of the touch event. The processor 1008 is configured to provide a corresponding visual output on the display panel 10041 according to the type of the touch event. Although the touch panel 10031 and the display panel 10041 illustrated in FIG. 10 each function as an independent component to achieve the input and output functions of the mobile phone, obviously, in some implementations, the touch panel 10031 and the display panel 10041 may be integrated to achieve the input and output functions of the mobile phone.

The mobile phone may also include at least one sensor 1005, such as a light sensor, a motion sensor, and other sensors. As one implementation, the light sensor may include an ambient light sensor and a proximity sensor, among which the ambient light sensor may adjust the brightness of the display panel 10041 according to ambient lights. The proximity sensor may turn off the display panel 10041 and/or backlight when the mobile phone reaches nearby the ear. As a kind of motion sensor, an accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related the applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 1006, a speaker 10061, a microphone 10062 may provide an audio interface between the user and the mobile phone. The audio circuit 1006 may convert the received audio data into electrical signals and transfer the electrical signals to the speaker 10061; thereafter the speaker 10061 converts the electrical signals into sound signals to output. On the other hand, the microphone 10062 converts the received sound signals into electrical signals, which will be received and converted into audio data by the audio circuit 1006 to output. The audio data is then processed and transmitted by the processor 1008 via an RF circuit 1001 to another mobile phone for example, or, the audio data is output to the memory 1002 for further processing.

Wi-Fi belongs to a short-range wireless transmission technology. With aid of the Wi-Fi module 1007, the mobile phone may assist the user in E-mail receiving and sending, webpage browsing, access to streaming media and the like. Wi-Fi provides users with wireless broadband Internet access. Although the Wi-Fi module 1007 is illustrated in FIG. 10, it should be understood that the Wi-Fi module 1007 is not essential to the mobile phone and can be omitted according to actual needs without departing from the essential nature of the present disclosure.

The processor 1008 is a control center of the mobile phone. The processor 1008 connects various parts of the entire mobile phone through various interfaces and lines. By running or executing software programs and/or modules stored in the memory 1002 and calling data stored in the memory 1002, the processor 1008 can execute various functions of the mobile phone and carry out data processing, so as to monitor the mobile phone as a whole. The processor 1008 can include at least one processing unit. The processor 1008 can be integrated with an application processor and a modem processor, where the application processor is mainly configured to handle and maintain an operating system, a user interface, applications, and so on. The modem processor is mainly configured to deal with wireless communication. It will be appreciated that the modem processor mentioned above may not be integrated into the processor 1008.

The mobile phone also includes a power supply 1009 (e.g., a battery) that supplies power to various components. For instance, the power supply 1009 may be logically connected to the processor 1008 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 5 to FIG. 7 can be realized based on the structure of the mobile phone.

The functions of the units illustrated in FIG. 8 can be achieved based on the structure of the mobile phone.

In one implementation, the processor 1008 can invoke computer programs stored in the memory 1002 to perform the following operations. After receiving an operation instruction for starting iris recognition, a first iris image of the user is acquired. Determine whether a target eyelash image in the first iris image is matched with a preset eyelash image template. When the target eyelash image is matched with the eyelash image template, the target eyelash image is cut out from the first iris image to obtain a second iris image. Determine whether the second iris image is matched with a preset iris image template; when the second iris image is matched with the iris image template, it indicates that the iris recognition for the user is successful.

Implementations of the present disclosure also provide a computer storage medium. The computer storage medium stores computer programs for electronic data interchange which, when executed, are operable with a computer to accomplish all or part of the operations of any of the methods described in the above-described method implementation. The computer can be a terminal device or other equipment.

Implementations of the present disclosure also provide a computer program product. The computer program product includes a non-transitory computer-readable storage medium storing computer programs. The computer programs are operable with a computer to perform all or part of the operations of any of the methods described in the above method implementations. The computer program product may be a software installation package. The computer can be a terminal device or other equipment.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), a disk or a compact disc (CD), and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A terminal device, comprising:
   an iris recognition assembly, configured to acquire N iris images of a user when the terminal device is in an awake state, and acquire a first iris image, N being a positive integer greater than 1, the first iris image comprising a target eyelash image;
   a memory, configured to store an eyelash image template; and
   a processor, coupled with the iris recognition assembly and the memory, configured to
   extract M eyelash images from the N iris images and obtain the eyelash image template according to the M eyelash images and a plurality of weight values, M being a positive integer smaller than or equal to N;
   determine whether the target eyelash image is matched with the eyelash image template;
   remove the target eyelash image from the first iris image to obtain a second iris image, in response to a determination that the target eyelash image is matched with the eyelash image template; and
   carry out iris recognition according to the second iris image.

2. The terminal device of claim 1, wherein the iris recognition assembly configured to acquire the first iris image is configured to:
   determine a pupil center and an iris radius of the user according to an eye image acquired; and
   extract the first iris image from the eye image according to the pupil center and the iris radius.

3. The terminal device of claim 2, wherein the processor is further configured to:
acquire boundaries of an eyelash image in the first iris image through boundary detection on the first iris image; and
extract the target eyelash image according to the boundaries of the eyelash image.

4. The terminal device of claim 1, wherein
the memory is further configured to store an iris image template; and
the processor configured to carry out the iris recognition according to the second iris image is further configured to:
remove, from the iris image template, an image in an area corresponding to the target eyelash image, to obtain an iris image sub-template; and
determine whether the second iris image is matched with the iris image sub-template.

5. A method for iris recognition, comprising:
acquiring N iris images of a user when a terminal device is in an awake state, N being a positive integer greater than 1;
extracting M eyelash images from the N iris images, M being a positive integer smaller than or equal to N;
obtaining a preset eyelash image template according to the M eyelash images and a plurality of weight values;
acquiring a first iris image, the first iris image comprising a target eyelash image;
determining whether the target eyelash image is matched with the preset eyelash image template;
removing, from the first iris image, the target eyelash image to obtain a second iris image, in response to a determination that the target eyelash image is matched with the preset eyelash image template; and
performing iris recognition according to the second iris image.

6. The method of claim 5, wherein the determining whether the target eyelash image is matched with the preset eyelash image template comprises:
extracting rough features of the target eyelash image; and
determining whether the target eyelash image is matched with the preset eyelash image template through a fuzzy comparison between the target eyelash image and the preset eyelash image template.

7. The method of claim 5, wherein the plurality of weight values is determined according to at least one of:
image quality; and
a proportion of an eyelash image in an iris image.

8. The method of claim 5, wherein the acquiring the first iris image comprises:
determining a pupil center and an iris radius of the user according to an eye image acquired; and
extracting the first iris image from the eye image according to the pupil center and the iris radius.

9. The method of claim 8, further comprising:
acquiring boundaries of an eyelash image in the first iris image through boundary detection on the first iris image; and
extracting the target eyelash image according to the boundaries of the eyelash image.

10. The method of claim 5, wherein the performing the iris recognition according to the second iris image comprises:
removing, from an iris image template, an image in an area corresponding to the target eyelash image to obtain an iris image sub-template; and
determining whether the second iris image is matched with the iris image sub-template.

11. A non-transitory computer-readable storage medium storing a computer program which, when executed by a processor, causes the processor to:
acquire N iris images of a user when a terminal device is in an awake state, N being a positive integer greater than 1;
extract M eyelash images from the N iris images, M being a positive integer smaller than or equal to N;
obtain an eyelash image template through superposition and synthesis on the M eyelash images;
acquire a first iris image;
determine a first eyelash image of the first iris image;
remove the first eyelash image from the first iris image to obtain a second iris image, in response to the first eyelash image being matched with the eyelash image template; and
perform iris recognition according to the second iris image.

12. The non-transitory computer-readable storage medium of claim 11, wherein the computer program executed by the processor to determine the first eyelash image of the first iris image is executed by the processor to:
acquire boundaries of an eyelash image in the first iris image through boundary detection on the first iris image; and
extract the first eyelash image according to the boundaries of the eyelash image.

13. The non-transitory computer-readable storage medium of claim 11, wherein the computer program executed by the processor to acquire the first iris image is executed by the processor to:
determine a pupil center and an iris radius of the user according to an eye image acquired; and
extract the first iris image from the eye image according to the pupil center and the iris radius.

14. The non-transitory computer-readable storage medium of claim 11, wherein the computer program executed by the processor to perform the iris recognition according to the second iris image is executed by the processor to:
remove, from an iris image template, an image in an area corresponding to a target eyelash image to obtain an iris image sub-template; and
determine whether the second iris image is matched with the iris image sub-template.

* * * * *